United States Patent [19]
Walsh et al.

[11] 4,104,447
[45] Aug. 1, 1978

[54] HALOGEN COMPLEXING ALKYL SALTS FOR USE IN HALOGEN CELLS

[75] Inventors: Fraser M. Walsh, Arlington; Dennis N. Crouse, Melrose; Alfred M. Ajami, Boston, all of Mass.

[73] Assignee: Eco-Control, Inc., Cambridge, Mass.

[21] Appl. No.: 836,553

[22] Filed: Sep. 26, 1977

[51] Int. Cl.$^2$ ............................................. H01M 8/22
[52] U.S. Cl. ........................................ 429/15; 429/29; 429/50; 429/101; 429/198; 252/182.1
[58] Field of Search ..................... 429/15, 29, 50, 101, 429/198, 201, 199; 252/182.1

[56] References Cited
U.S. PATENT DOCUMENTS

| | | | |
|---|---|---|---|
| 2,566,114 | 8/1951 | Bloch | 429/199 |
| 3,738,870 | 6/1973 | Rossi | 429/201 |
| 3,816,177 | 6/1974 | Walsh | 429/201 |

*Primary Examiner*—Donald L. Walton
*Attorney, Agent, or Firm*—Kenway & Jenney

[57] ABSTRACT

Alkyl or haloalkyl substituted quaternary ammonium salts having a nitrogen cation symmetry number no greater than three, or mixtures thereof, are added to the electrolyte of otherwise conventional halogen cells. The compounds form complexes with elemental chlorine, bromine, iodine, or mixtures thereof in the electrolyte which complexes, comprise predominantly electrolyte-insoluble liquids at the temperatures at which the cells are normally run, are characterized by rapid halogenation and dehalogenation, and thus are well suited for halogen storage in battery or fuel cell applications. The shelf-life and capacity of electrochemical systems containing an additive of the invention are improved.

26 Claims, 4 Drawing Figures

HALOGEN COMPLEXING ALKYL SALTS FOR USE IN HALOGEN CELLS

BACKGROUND OF THE INVENTION

This invention relates to compounds useful for complexing halogens and more particularly to compounds useful, either alone or in admixture, as an electrolyte additive for electrochemical cells and batteries of the type which utilize a halogen as its electrochemically active agent.

Voltaic cells which include an aqueous solution of metal halide, e.g., cadmium or zinc halide, as an electrolyte are known, but are frequently characterized by a relatively high self-discharge rate, low capacity, and high internal resistance. Because elemental halogen is soluble in the aqueous electrolyte, it is difficult to keep metallic zinc or cadmium and elemental halogen apart while simultaneously achieving a system in which a good percentage of the theoretical energy storage capacity can be realized.

Various attempts have been made to prevent elemental halogen from migrating to the zinc or cadmium electrode. For example, U.S. Pat. Nos. 2,566,114 and 3,373,058 to M. R. Bloch teach the use of quaternary ammonium halides in zinc or cadmium halogen cells. However, the salts suggested for use in such cells have cations which have tetrahedral symmetry (nitrogen cation symmetry number equal to twelve), exist as a crystalline material when complexed with halogen, and exhibit poor halogenation-dehalogenation kinetics. While such crystalline quaternary ammonium halides are capable of reducing the concentration of dissolved halogen during cell charge and discharge, because of their crystalline nature, they are unable to rapidly complex and release halogen and to remain concentrated in the vicinity of the current collector during cell cycling.

U.S. Pat. No. 3,816,177 to M. A. Walsh teaches the use of soluble quaternary ammonium halides and the like which are dissolved in the electrolyte together with a water soluble depolarizer. When elemental halogen is released into the electrolyte, it combines with the quaternary halide to form a quaternary polyhalide which in turn complexes with the depolarizer to form an insoluble, halogen rich, liquid complex. If an inert electrode made of a material which absorbs the insoluble complex is employed, an improved cell is provided because the liquid complex, being fluid, permits rapid diffusion of halogen during cell charge and discharge and because the complexed halogen molecules, being concentrated about the current collector, are available for electrochemical reaction to an improved degree. While this system represents a significant improvement over the use of crystalline quaternary polyhalides, it suffers from the requirement that the depolarizer, which cannot directly complex halogens, must be part of the liquid complex.

Further improvements in halogen electrochemical cells are disclosed in U.S. Pat. No. 4,038,459 to A. M. Ajami et al. entitled *Halogen Complexing Alcohols and Nitriles* and in U.S. Pat. No. 4,038,460 to F. M. Walsh et al. entitled *Halogen Complexing Ethers*. The water-soluble alcohols, ethers or nitriles disclosed in these patents form liquid polyhalides in the presence of elemental halogens or quaternary ammonium-halogen complexes which polyhalides are insoluble and halogen-rich. While cells and batteries containing these types of additives have certain advantages, they suffer from the temperature dependent reaction of alcohols, ethers or nitriles with the free halogens and hydrogen ions present in the aqueous zinc or cadmium halide electrolytes.

Another approach to the problem of improving the performance of halide cells is disclosed in U.S. Pat. No. 4,065,601 entitled Two Phase Electrolytes Used as Halogen Traps in Metal Halogen Secondary Cells. This application teaches the use of two phase electrolyte comprising an aqueous phase and a water immiscible organic phase. A halogen complexing organic salt such as an ammonium, pyridinum, sulfonium, or phosphonium salt is dissolved in the organic phase. This system depends on gravity separation of the phases of the electrolyte or on the ability of the halide electrode to absorb the organic phase.

The instant invention constitutes a further improvement in the halogen cell art and provides a large number of compounds, one or more of which may be added to the electrolyte of halogen cells of the type described. The compounds of the invention eliminate the requirement of adding a depolarizer or other additional additive to the electrolyte yet significantly increase the useful temperature and hydrogen concentration range at which the cells can successfully operate, provide increased halogen complexing ability, and thus enhance the shelf life and capacity of the cells and batteries in which they are used.

SUMMARY OF THE INVENTION

In general, the invention features compounds which may be added to the electrolyte of an otherwise conventional halogen cell or battery to significantly improve its performance. It has now been discovered that certain quaternary ammonium salts rapidly and reversibly react with elemental halogen to form predominantly liquid complexes which are substantially electrolyte insoluble. Furthermore, these complexes exhibit a significantly improved stability in the electrochemical system in which they are used by resisting spontaneous halogenation and other deleterious side reactions.

Broadly, the compounds useful as additives in accordance with the invention are quaternary ammonium salts substituted with alkyl ($C_1$-$C_7$) or halogen-substituted alkyl ($C_1$-$C_7$) groups such that the cationic nitrogen symmetry number is no greater than three. Apparently because of the low degree of symmetry about the cationic site, the additives of the invention form predominately liquid complexes in the presence of one or more equivalents of halogen and undergo rapid halogenation and dehalogenation.

In accordance with another aspect of the invention, an additive is provided which comprises two or more quaternary ammonium salts of the type described above having different alkyl or haloalkyl substituents about the respective cationic sites and/or having different halide anions. Additives consisting of mixtures of this nature are preferred since, in accordance with known theory, the freezing point of the mixture is depressed. This means that the halogen complexes which result from such mixtures remain liquid at lower temperatures and may be rapidly dehalogenated over an increased temperature range. Those skilled in the art will appreciate that, for purposes of the invention, the less symmetry about the cationic site the better. Thus, quaternary ammonium salts having a nitrogen cation symmetry number equal to one are preferred. Also, it will be within the skill of those in the art to produce any compounds of the class described using alkyl or haloalkyl functionalities other than those specifically set forth herein.

Particular compounds useful as an additive in accordance with the invention include:

N,N-diethyl-N-propyl-N-methyl ammonium bromide;
N,N,N-triethyl-N-2-bromoethyl ammonium bromide;
N,N-dimethyl-N-ethyl-N-isopropyl ammonium bromide;
N,N,N-triethyl-N-butyl ammonium bromide;
N,N-diethyl-N,N-dimethyl ammonium bromide;
N,N,N-tributyl-N-methyl ammonium bromide;
N-2-chloroethyl-N,N,N-trimethyl ammonium bromide;
and mixtures thereof.

Accordingly, it is an object of the invention to provide additives for cells and batteries of the type described which are capable of greatly improving the performance of halogen utilizing electrochemical systems by rapidly complexing elemental halogen in the electrolyte.

Another object of the invention is to provide a large number of compounds, one or more of which may be added to metal halide electrolytes to complex and hold chlorine, bromine, and/or iodine more efficiently than the aforementioned tetrahedral quaternary ammonium salts.

Another object of the invention is to provide a group of compounds capable of complexing halogens as halogen-rich liquids in electrochemical cells or batteries which obviates the necessity of adding additional substances such as depolarizers.

Still another object of the invention is to provide compounds which, when complexed with one or more molar equivalents of halogen, comprise chemically stable liquids which are substantially insoluble in aqueous halide solutions even at elevated temperatures and relatively high hydrogen ion concentrations, and which partition from the aqueous electrolyte to provide a source of halogen that may be readily utilized in halogen cells or batteries.

Yet another object of the invention is to provide compounds which, when complexed with one or more molar equivalents of halogen, comprise reasonable conductive liquids and therefore allow the halogens to undergo electrochemical reduction at the electrode of a halogen cell or battery at a reasonable rate.

Still another object of the invention is to provide compounds which, when complexed with one or more molar equivalents of halogen, comprise liquids which can be pumped and stored indefinitely, thereby being suitable for use, directly or indirectly, as a source for halogen in a regenerative fuel cell or battery, and which do not structurally alter carbon electrodes or most halogen degradable plastics.

DESCRIPTION OF THE PREFERRED EMBODIMENT

Figure 1:
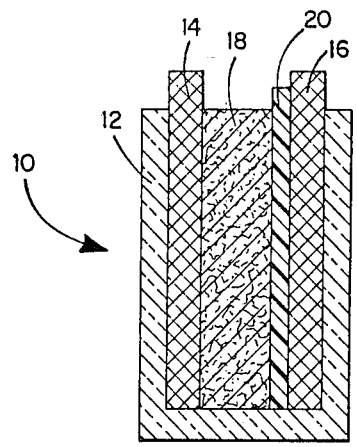
FIG. 1 is a cross-sectional view of a cell of the type with which the complexing compounds of the invention are useful.

At the outset, it is desirable to comment on certain terms that are used throughout this specification and claims. The terms "zinc electrode" and "bromine electrode" are not intended to imply that the electrodes are formed from these materials exclusively. As is conventional practice, these terms are used merely to indicate the electrochemically active element reacting. The metal and halogen electrodes of the cells with which the compounds of the present invention are employed, are electrochemically conductive and preferably porous. Carbon in its various forms is a preferred material. The carbon of the metal electrode serves as a plating surface for the reactive metal.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art. Because cadmium, iron, titanium, chromium, and hydrogen are electrochemically similar to zinc, it is also obvious that the zinc of the electrode and the electrolyte can be replaced by these elements. In this regard it should also be noted that as used herein, metal electrode includes a hydrogen electrode of the type well-known in the art which utilizes an inert metal current collector. Although bromine is used throughout this specification and claims, it will be apparent to those skilled in the art that chlorine, iodine, or any combination of bromine, chlorine, and iodine may be substituted therefor. In fact, certain advantages accrue to the simultaneous use of two or more different halogens.

Although quaternary ammonium salts are extensively discussed herein, it should also be noted that dimers and trimers of such salts as well as phosphonium or sulfonium salts selected in accordance with the teaching set forth below will be the equivalent of the salts specifically set forth and may be used without departing from the spirit and scope of the invention.

During the discharge of the well known zinc bromine cell, the following half reactions occur:
at cathode $Br_2 + 2e \rightarrow 2Br^-$
at anode $Zn^0 \rightarrow Zn^{++} + 2e^-$
On charging, the reactions are reversed:
at cathode $2Br^- \rightarrow Br_2 = 2e^-$
at anode $Zn^{++} + 2e^- \rightarrow Zn^0$ The zinc bromide of the electrolyte is thus consumed during charge and produced during discharge. In order for the cell to function properly, $Br_2$, which obviously must be present near the cathode when the cell is undergoing discharge, must somehow be stored. Since $Br_2$ is soluble in water containing solubilized metal halides, precautions must be taken to prevent it from migrating through the aqueous electrolyte and reacting directly with the metal at the anode. This goal has been achieved by incorporating a porous, conductive preferably carbon matrix of the type disclosed in U.S. Pat. No. 3,816,177 to M. A. Walsh, entitled *Secondary Cells and Batteries,* the disclosure of which is incorporated herein by reference, and one or more of the compounds of the invention, into an otherwise conventional halogen cell. When the electrolyte containing a compound (additive) of the invention is absorbed into the porous electrode, elemental bromine produced during charging is complexed by the additive and prevented from solubilizing in the aqueous electrolyte.

The complexing compounds of this invention are substances having the following structural formula:

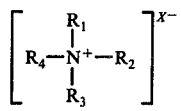

wherein $X^-$ is a counterion, preferably $Cl^-$, $I^-$, or $Br^-$, and $R_1$-$R_4$ are alkyl groups, unsubstituted or halogen substituted, having 1-7 carbon atoms. In accordance with the invention, $R_1$-$R_4$ must be selected such that the sterochemistry about the $N^+$ cationic site is non tetrahedral. A tetrahedral cationic configuration will result where $R_1 = R_2 = R_3 = R_4$. In this situation, the nitrogen cation symmetry number, that is, the number of indistinguishable special orientations into which the molecule can be turned by simple rigid rotation about axes passing through the nitrogen cation, is 12. Salts of this character form complexes which easily crystallize and exhibit poor halogenation and dehalogenation kinetics. However, even where $R_1 = R_2 = R_3 = R_4$, including $R_1 = CH_3$, the tetrahedral nature of the carbon alpha to the nitrogen and the angle of rotation of the carbon-nitrogen bond can produce cations in liquid phase with a symmetry number of three or less and can be used with other cations to form liquid polyhalides.

When $R_1 \neq R_2 = R_3 = R_4$, only three indistinguishable positions formed by simple rigid rotation are possible (symmetry number = 3). When $R_1 = R_2 \neq R_3 = R_4$, the symmetry number is 2; when $R_1 \neq R_2 \neq R_3 = R_4$, the symmetry number is 1, and when $R_1 \neq R_2 \neq R_3 \neq R_4$, the symmetry number is 1.

All of the salts of the type set forth immediately above have a symmetry number no greater than 3. Accordingly, their halogen complexes tend to be amorphous. This results in rapid halogenation and dehalogenation and good conductivity. There is also a general trend of lower freezing points with lower symmetry numbers. However, there is no quantifiable relationship between the symmetry number of the ammonium moiety and the melting point of its polyhalogen derivative. Thus, if a particular low melting point is desired, the melting point of a particular quaternary ammonium polyhalide should be empirically determined before selection for battery application.

In accordance with another aspect of the invention, a mixture of two or more salts having symmetry numbers no greater than three is employed. This results in an additive having a polyhalogen derivative with a lower freezing point and increased randomness as compared with the individual compounds included in the mixture. The phenomenon of freezing point depression is quantified by the expression:

$$\Delta T = \frac{R(T_x)^2 (mw_x)(m_y)}{1000 \Delta Hfus_x} \quad (1)$$

where $\Delta T$ is the freezing point depression of compound $x$ (° K), R is the gas constant, $T_x$ is the freezing point of pure $x$(° K), $mw_x$ is the molecular weight of $x$, $m_y$ is the molality of compound $y$ in $x$, and $\Delta Hfus_x$ is the heat of fusion of $x$. Equation 1 shows that as the molality of $y$ in $x$ is increased up to a 50:50 mixture, the freezing point depression of $x$ increases. Where $x$ and $y$ are two different quaternary ammonium complexes at the same halogenation level, the freezing points of both will be depressed when mixed together. Since equation 1 limits $\Delta T$ to physical parameters which can be varied only slightly, it is important that $T_x$ be as low as possible. Thus, the importance of employing relatively low freezing point polyhalides having nitrogen cation symmetry numbers no greater than three can be appreciated. It should also be noted that the symmetry and freezing points of additives and complexes of the invention are also lowered if mixtures of bromide, chloride, and/or iodide salts are employed, even if only one quaternary cation is used.

It is desirable but not critical that the compound or compounds used as a complexing additive, prior to complexing, be soluble in the zinc halide electrolyte of the cell. Also, it should be as stable as possible, thus resisting chemical breakdown and bromination under the conditions which obtain in the cell. Saturated compounds are preferred. Thus, the compounds of the invention are quaternary ammoniums wherein at least one of the four substituents at the cationic site differs from the remaining substituents by having at least one more or fewer carbon atoms or by being substituted with one or more halogens such as bromine, chlorine or iodine.

Lower molecular weight compounds, i.e., wherein $R_1$-$R_4$ have between 1 and 5 carbon atoms are preferred. This is because the halogen complexing ability of the compounds is essentially independent of the nature of the functionalities about the nitrogen atom. Accordingly, when the molecular weight of $R_1$-$R_4$ is low, the halogen complexed per unit mass of compound is high. Preferred additives include but are not limited to compounds such as N,N-diethyl-N-propyl-N-methyl ammonium bromide; N,N,N-triethyl-N-2-bromoethyl ammonium bromide; N,N-dimethyl-N-ethyl-N-isopropyl ammonium bromide; N,N,N-triethyl-N-butyl ammonium bromide; N,N-diethyl-N,N-dimethyl ammonium bromide; N,N,N-tributyl-N-methyl ammonium bromide; N-2-cloroethyl-N,N-triethyl ammonium bromide; and mixtures thereof.

Methods of synthesizing compounds of the type described above are generally well known in the art; see, for example, J. Goerdeler in Houben-Weyl, Methoden der organischen Chemie, Bd. XI/2, p. 587, Georg Thieme Verlag, Stuttgart 1958. The procedure may be summarized as follows:

$$R_nN + R'Br \rightarrow R_nR'N^+Br^-$$

wherein R is an alkyl or haloalkyl, etc.; $n$ is 3, and R' is an alkyl or haloalkyl different from R. Various modification, well known to those skilled in the art, can produce a wide variety of the types of compounds disclosed above. For example, the 3 functionalities bonded to the N atom may be different. Also, it is a matter of routine skill to dimerize or trimerize quaternary ammonium salts to produce compounds having more than one cationic site such as

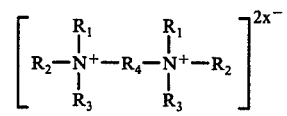

One successful compound has been prepared as follows:

In an 100 ml round bottom flask fitted with a dry ice acetone reflux condenser, 250 mmole of triethyl amine in acetonitrile (50 ml) is stirred and cooled to 0° C while 300 mmole of methyl bromide is added dropwise. The reaction is allowed to warm up to 25° C and stirred overnight. The solvent and excess reagents are removed at reduced pressure and the solid residue is crystallized from isopropanol yielding 43.0 g. (88%) of a white crystalline quaternary ammonium bromide (symmetry number = 3) according to the reaction:

$N(CH_2CH_3)_3 + CH_3Br \rightarrow (CH_3CH_2)_3-^+N-CH_3Br^-$

Referring to FIG. 1, a cell 10 of the type in which additives of the invention are useful is shown. The cell comprises a case 12, a pair of graphite electrodes 14, 16, a graphite-felt mass 18, and a porous polymeric separator 20. Graphite electrode 14 acts as the bromine electrode; electrode 16 acts as the metal electrode for formation of zinc, cadmium, iron, titanium, chromium or hydrogen. Electric leads (not shown) are connected to the electrodes by means of clips. Electrodes 14, 16 have a porosity of 26%. A suitable graphite felt is available commercially from Union Carbide Corporation (VWF grade), and a suitable separator may be purchased from W. R. Grace, Inc. under the tradename DARAMIC.

Figure 4:
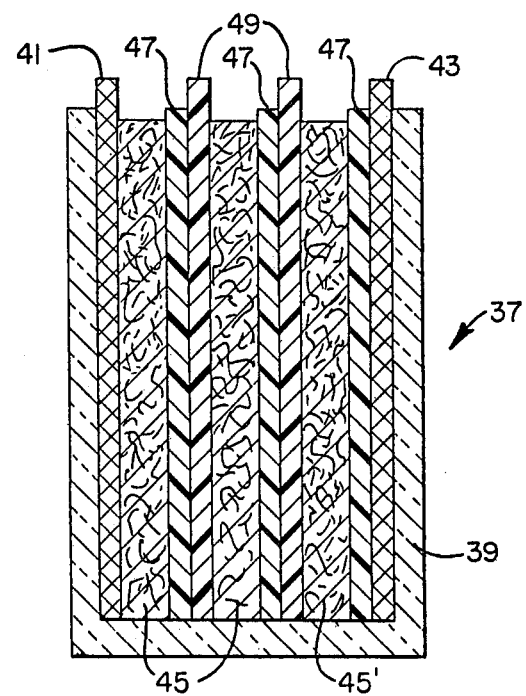
FIG. 4 is a cross-sectional view of a battery of the type with which the complexing compounds of the invention are useful.

FIG. 4 depicts a bipolar, multi-celled battery 37 of the type which utilizes the additive of the invention. It comprises a glass, water-tight case 39 which encloses a pair of graphite plate current collectors 41, 43. Plate 43 serves as a metal electrode. Interposed between the current collectors 41, 43 is an array of graphite felt masses 45 which serve as counter electrodes. A porous polymeric separate 47 (Daramic, approximately 0.125 in. thick) and a bipolar electrode 49 (conductive polymer film made by Conductive Polymer Corporation, Marblehead, Massachusetts, approximately 0.020 in. thick) are in turn interposed between each graphite felt mass 45. The number of cells in the battery, of course, may be increased or decreased as desired.

The electrolyte of the above-described electrochemical system, which is contained in the felt masses, comprises aqueous solutions of inorganic salts, such as zinc halide or cadmium halide, up to 50% of one of the additives described above, and may include 0 to 30% of one or more of various well known additives for improved plating.

To demonstrate the effect of the compounds of the invention, a cell with a stationary electrolyte as described above was charged until more than 80% of the zinc halide initially in solution was converted into zinc and halogen. Charging current densities ranged typically from 5 to 25 amperes per square foot. All cells were tested at a constant current drain for a variety of current densities.

Figure 2:
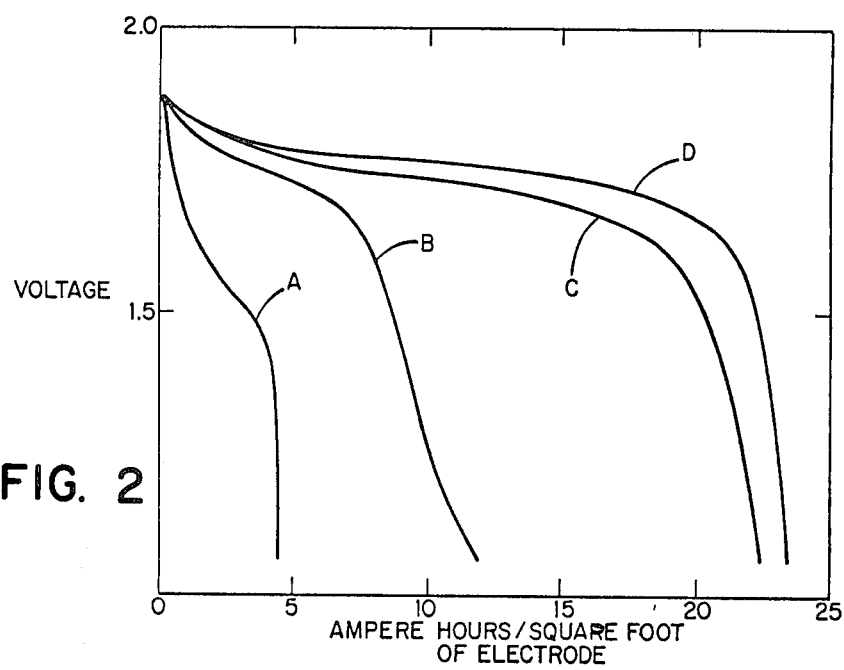
FIG. 2 is a graph of voltage vs. ampere hours/square foot of electrode surface which illustrates the improved storage capacity of cells constructed in accordance with FIG. 1 when a complexing compound of the invention is added to the electrolyte.

Data obtained from these tests are summarized in FIG. 2. The curves were obtained by measuring ampere hours of current output, at various voltages, for cells with a stationary electrolyte which had been charged as described above. For the curve labeled A, the electrolyte consisting of 0.4M $ZnBr_2$ and 0.2M $ZnSO_4$ in water. For B, the electrolyte consisted of 0.4M $ZnBr_2$, 0.2M $ZnSO_4$, and 7% by volume BL-330, an aliphatic polyether available commercially from GAF Corporation. The electrolyte of C comprised 0.4M $ZnBr_2$, 0.2M $ZnSO_4$, and 0.4M $(CH_3)_4NBr$ in 9:1, by volume, water to propylene carbonate (depolarizer). The electrolyte of D comprised 0.4M $ZnBr_2$, 0.2M $ZnSO_4$ and 0.2M N,N-diethyl-N-propyl-N-methyl ammonium bromide, that is, one of the halogen complexing compounds of the invention. These curves demonstrate that a significantly greater number of ampere hours may be obtained from a cell whose electrolyte contains an additive of the invention, and that the compounds of the invention, when added to the electrolyte, increase cell capacity.

Figure 3:
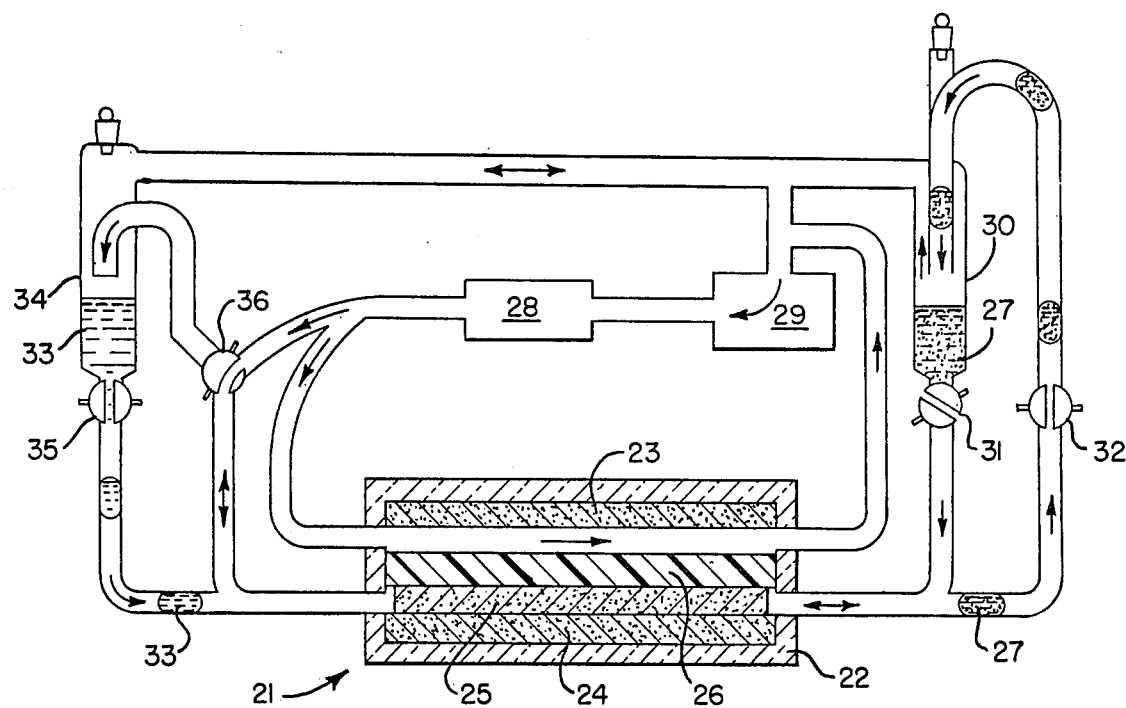
FIG. 3 is a schematic representation of a regenerative fuel cell with a recirculating electrolyte in which the complexing compounds of the invention are useful.

Referring to FIG. 3, a cell 21 is shown which utilizes a recirculating electrolyte containing a halogen complexing additive of the invention. The cell 21 comprises a case 22, a pair of graphite electrodes 23, 24, a graphite felt mass 25, and a porous polymeric spearator 26. The equipment for storing the halogen complex 27 and providing fresh electrolyte, comprises a pump 28, an electrolyte reservoir 29, a halogen complex reservoir 30, and a pair of valves 31 and 32 for storing and releasing the halogen complex 27. During charging through terminals attached to electrodes 23 and 24 (not shown), the halogen complex 27 is formed in the felt 25 from either a water soluble or water insoluble additive of the present invention, i.e., liberated $Br_2$ combines as disclosed above to form a $Br_2$ complex. The resulting insoluble liquid halogen complex 27 is pumped to reservoir 30 where, by opening valve 31, it can be drained back into felt 25 for consumption during discharge. The metal is plated out on electrode 23 during charge with the quality of the plate and plating characteristic dependent, inter alia, on flow rate. When a water insoluble additive 33 is employed, a storage reservoir 34 and a pair of valves 35 and 36 may be included for storing and releasing the alkyl additive 33. This cell can also be operated using the halogen released from the halogen complex. The electrolyte of the cell comprises inorganic salts, such as zinc halide or cadmium halide, up to 50% of one of the compounds of the invention, and may include 0 to 30% of one or more of the various well known additives for improving plating characteristics. Those skilled in the art will appreciate that complex 27 may be used to drive cells other than the one illustrated in FIG. 3. For example, in addition to zinc and cadmium cells, the complexes will be useful in other halogen utilizing cells which may employ, for example, iron, titanium, chromium, or hydrogen as an anode.

To demonstrate the effect of the compounds of the invention, a cell with a recirculating electrolyte as described above containing N,N-diethyl-N-propyl-N-methyl ammonium bromide was charged at current densities ranging from 10 to 60 amperes per square foot for periods of time ranging from 1 to 3 hours. The cell tested at a constant current drain for a variety of current densities and was demonstrated to have a coulombic efficiency of 60 to 90% and an energy efficiency of 50 to 70%. Without an additive of the present invention in the electrolyte, no halogen complex 27 is formed, and the bromine, which dissolves in the electrolyte, reacts with the zinc plate on electrode 23 resulting in a coulombic and energy efficiency of less than 10%.

Table I illustrates that the halogen complexing property holds for a representative cross-section of the class of compounds of the invention. The data in the table were obtained by mixing 12 mM of bromine in a flask containing 10 ml of 2M $ZnBr_2$, and 4 mmole of the complexing compound. Partitioning of the bromine complex and the aqueous phase was achieved by vigorous stirring. Stirring for 18 hours under these conditions was shown to yield identical results. The bromine complex and aqueous phases were then separated by centrifugation and the aqueous phase was titrated for bromine.

Table 1

| Complexing Compound | %Br Remaining in aqueous phase |
|---|---|
| 1) QmBr | (23)+ |
| 2) QmBr Sulfolane (900 mg) | 25 |
| 3) O Br-1 | 18 |
| 4) CN Br-1 | 24 |
| 5) OH Br-1 | 25 |
| 6) ECO-1 | 13 |
| 7) ECO-2 | 11 |
| 8) ECO-3 | 13 |
| 9) ECO-4 | 13 |

+The quaternary ammonium polybromide phase was crystalline.

In the foregoing table,

QmBr is phenyl trimethyl ammonium bromide

Sulfolane is tetramethylene sulfone

O Br-1 is N,N,N-triethyl-N-ethoxy-ethylene ammonium bromide

CN Br-1 is N,N,N-triethyl-N-2-cyanoethyl ammonium bromide

OH Br-1 is N,N,N-triethyl-N-3-hydroxy propyl ammonium bromide

ECO-1 is N,N,N-triethyl-N-methyl ammonium bromide

ECO-2 is N,N-diethyl-N-propyl-N-methyl ammonium bromide

ECO-3 is N,N,N-triethyl-N-2-bromoethyl ammonium bromide

ECO-4 is a 1:1 molar mixture of ECO-1 with N,N,N-triethyl-N-butyl ammonium bromide (ECO-5)

As can be seen from a study of Table 1, the alkyl and haloalkyl compounds of the invention (examples 6–9) complex a greater percentage of the available bromine as liquid polyhalide than either the quaternary ammonium salt of example 1, the quaternary ammonium salt-aprotic dipole (sulfolane) system of example 2, or the ether, nitrile, or alcohol group containing compounds of examples 3–5.

Table 2, set forth below, illustrates that the alkyls and haloalkyls of the invention, as represented by the 5 embodiments set forth above (ECO-1 – ECO-5), form liquid polyhalides at 25° C at all useful bromination levels. As noted above, the ability of these compounds to form liquid polyhalides at 25° C is related to the symmetry number of the complexing compound caused by appropriate functionalization at the cationic site.

Table 2

| Complexing Compound | Bromination Level | | | | |
|---|---|---|---|---|---|
| | $Br_3$ | $Br_5$ | $Br_7$ | $Br_9$ | $Br_{11}$ |
| 1) ECO-1 | l | l | l | c | l |
| 2) ECO-2 | l | l | l | l | l |
| 3) ECO-3 | l | l | l | l | l |
| 4) ECO-4 | l | l | l | l | l |
| 5) ECO-5 | l | l | l | c | l | where
l = liquid
c = crystal

The data in Table 2 were obtained by mixing the amount of bromine required to form the disclosed bromination level in a test tube containing 1 mmole of the complexing agent in 2 ml of 3M $ZnBr_2$. The solution was frozen and thawed repeatedly to induce crystallization.

Table 3 illustrates that the alkyl and haloalkyl compounds of the invention are more stable at elevated temperature than are corresponding ether or alcohol functionalized complexing compounds.

Table 3

Stability at 50° C in 2M $ZnBr_2$ as the Pentabromide

| Complexing Compound | pH initially | pH after 16 hrs. |
|---|---|---|
| 1) ECO-2 | 3.2 | 3.2 |
| 2) DMBr | 4.4 | 1.8 |
| 3) Choline Bromide | 3.8 | 1.0 |
| 4) ECO-6 | 4.2 | 4.2 |

Where:
ECO-2 is N,N-diethyl-N-propyl-N-methyl ammonium bromide
DMBr is N,N-dimethyl morpholonium bromide
Choline Bromide is N,N,N-trimethyl-N-hydroxyethyl ammonium bromide
ECO-6 is N,N-diethyl-N-methyl-N-chloromethyl ammonium bromide The data in Table 3 were obtained by holding a 50° C capped test tubes containing 2.5 mmoles of the complexing compound in 5 ml of 2M $ZnBr_2$ with 5 mmoles of bromine. The pH of the zinc bromide phase was monitored. A decrease in pH is indicative of the formation of HBr from compound degradation. The solutions are initially weakly acidic due to the Lewis acid strength of the zinc species. These data illustrate the significantly increased temperature stability of the alkyls or bromoalkyls in the presence of free halogens and hydrogen ion.

Table 4 illustrates that the alkyl and haloalkyl compounds of the invention are more stable in the presnece of acid at elevated temperatures than is the corresponding nitrile functionalized complexing compounds.

Table 4

Stability at 80° C in 0.1 M $D_2SO_4/D_2O$

| Complexing Compound | After 24 hrs | After 76 hrs |
|---|---|---|
| 1) ECO-6 | Stable | Stable |
| 2) ECO-7 | Stable | Stable |
| 3) CN Br-2 | Stable | Decomposed |
| 4) CN Br-3 | Stable | Decomposed |

Where:
ECO-6 is N,N-diethyl-N-methyl-N-chloromethyl ammonium bromide
ECO-7 is N,N-diethyl-N,N-dimethyl ammonium bromide
CN Br-2 is N-2-cyanoethyl-N,N-diethyl-N-methyl ammonium bromide
CN Br-3 is N-3-cyanopropyl-N,N,N-triethyl ammonium bromide.

The data in Table 4 was obtained by holding at 80° C capped NMR tubes containing 0.01 mmole of the complexing compound in 1 ml of deuterated 0.1 M deuterated sulfuric acid. Decomposition was determined by chemical shifts in protons by nuclear magnetic resonance spectroscopy. A chemical shift was observed for the nitriles due to hydrolysis of the nitrile.

The invention may be embodied in other specific forms without departing from the spirit or essential characterization thereof; the present embodiments are therefore to be considered in all cases as illustrative and not restrictive, the scope of the invention being indicated by the appended claims rather than by the foregoing description, and all changes which come within the meaning and range of equivalency of the claims are therefore intended to be embraced therein.

We claim:

1. A process for improving the performance of current delivering electrochemical systems of the type which utilize a substance selected from the group consisting of bromine, chlorine, iodine, and mixtures thereof as their electrochemically active agent, said process comprising adding to the electrolyte of said system, at least one halogen complexing compound which exists as a substantially water insoluble liquid at the operating temperature of the system in the presence of one or more equivalents of halogen, said compound being selected from the group consisting of alkyl ($C_1$-$C_7$) and haloalkyl ($C_1$-$C_7$) substituted quaternary ammonium salts having a cationic nitrogen symmetry number no greater than three and a halide counterion.

2. The process as set forth in claim 1 wherein at least two halogen complexing compounds having different alkyl or haloalkyl substituents are employed.

3. The process as set forth in claim 1 wherein at least two halogen complexing compounds having different halide anions are employed.

4. The process as set forth in claim 1 wherein a compound having a cationic nitrogen symmetry number equal to one is employed.

5. The process as set forth in claim 1 wherein the compound is selected from the group consisting of:
N,N-diethyl-N-propyl-N-methyl ammonium bromide;
N,N,N-triethyl-N-2-bromoethyl ammonium bromide;
N,N-dimethyl-N-ethyl-N-isopropyl ammonium bromide;
N,N,N-triethyl-N-butyl ammonium bromide;
N-2-chloroethyl-N,N,N-trimethyl ammonium bromide;
N,N-diethyl-N-methyl-N-chloromethyl ammonium bromide;
N,N-diethyl-N,N dimethyl ammonium bromide;
N,N,N-tributyl-N-methyl ammonium bromide; and mixtures thereof.

6. An electrochemical cell comprising a case, a porous conductive halogen electrode, an Me electrode, an aqueous electrolyte containing an inorganic substance of the formula MeX, wherein Me is selected from the group consisting of zinc, cadium, iron, titanium, chromium, and hydrogen, and X is selected from the group consisting of bromide, chloride, iodide, and mixtures thereof, and an additive in said electrolyte consisting of at least one halogen complexing compound which exists as a substantially water insoluble liquid at the operating temperature of the cell in the presence of one or more equivalents of halogen, said compound being selected from the group consisting of alkyl ($C_1$-$C_7$) and haloalkyl ($C_1$-$C_7$) substituted quaternary ammonium salts having a cationic nitrogen symmetry number no greater than three and a halide counterion.

7. The cell as set forth in claim 6 wherein at least two halogen complexing compounds having different alkyl or haloalkyl substituents are employed.

8. The cell as set forth in claim 6 wherein at least two halogen complexing compounds having different halide anions are employed.

9. The cell as set forth in claim 6 wherein a compound having a cationic nitrogen symmetry number equal to one is employed.

10. The cell as set forth in claim 6 wherein the compound is selected from the group consisting of:
N,N-diethyl-N-propyl-N-methyl ammonium bromide;
N,N,N-triethyl-N-2-bromoethyl ammonium bromide;
N,N-dimethyl-N-ethyl-N-isopropyl ammonium bromide;
N,N,N-triethyl-N-butyl ammonium bromide;
N,N-diethyl-N,N-dimethyl ammonium bromide;
N,N,N-tributyl-N-methyl ammonium bromide;
N,N-diethyl-N-methyl-N-chloromethyl ammonium bromide;
N-2-chloroethyl-N,N,N-trimethyl ammonium bromide; and mixtures thereof.

11. The cell as set forth in claim 6 wherein said cell is a secondary cell.

12. The cell as set forth in claim 6 further comprising means for storing additive complexed with halogen during charging.

13. The cell as set forth in claim 6 further comprising means for recirculating the electrolyte.

14. The cell as set forth in claim 13 comprising means for storing said additive.

15. A halogen-rich, substantially water insoluble, liquid complex for use in electrochemical cells of the type which utilize a halogen selected from the group consisting of chlorine, bromine, iodine, and mixtures thereof as their electrochemically active agent, said complex consisting essentially of an elemental halogen selected from the group consisting of chlorine, iodine bromine, and mixtures thereof and a compound selected from the group consisting of alkyl ($C_1$-$C_7$) and haloalkyl ($C_1$-$C_7$) substituted quaternary ammonium salts having a cationic nitrogen symmetry number no greater than three and a halide counterion.

16. The complex as set forth in claim 15 wherein at least two halogen complexing compounds having different alkyl or haloalkyl substituents are employed.

17. The complex as set forth in claim 15 wherein at least two halogen complexing compounds having different halide anions are employed.

18. The complex as set forth in claim 15 wherein a compound having a cationic nitrogen symmetry number equal to one or two is employed.

19. The complex as set forth in claim 15 wherein the compound is selected from the group consisting of:
N,N-diethyl-N-propyl-N-methyl ammonium bromide;
N,N,N-triethyl-N-2-bromoethyl ammonium bromide;
N,N-dimethyl-N-ethyl-N-isopropyl ammonium bromide;
N,N,N-triethyl-N-butyl ammonium bromide;
N,N-diethyl-N,N-dimethyl ammonium bromide;
N,N,N-triethyl-N-methyl ammonium bromide;
N,N,-diethyl-N-methyl-N-chloromethyl ammonium bromide;
N-2-chloroethyl-N,N,N-trimethyl ammonium bromide; and mixtures thereof.

20. A battery of the type including a casing, Me electrodes, an aqueous electrolyte containing an inorganic substance of the formula MeX, where Me is selected from the group consisting of cadmium, zinc, iron, titanium, chromium, and hydrogen and X is selected from the group consisting of bromide, chloride, iodide, and combinations thereof, a plurality of counter electrodes spaced apart from said Me electrodes, and an additive in said electrolyte consisting of a halogen complexing compound which exist as a substantially insoluble liquid in aqueous metal halide solutions at battery operating temperatures in the presence of one or more molar equivalents of halogen, said additive being selected from the group consisting of alkyl ($C_1$-$C_7$) and haloalkyl ($C_1$-$C_7$) substituted quaternary ammonium salts having a cationic nitrogen symmetry number no greater than three and a halide counterion.

21. The battery as set forth in claim 20 wherein at least two halogen complexing compounds having different alkyl or halo-alkyl substituents are employed.

22. The battery as set forth in claim 20 wherein at least two halogen complexing compounds having different halide anions are employed.

23. The battery as set forth in claim 20 wherein a compound having a cationic nitrogen symmetry number less than three is employed.

24. The battery as set forth in claim 20 wherein the additive is selected from the group consisting of:
N,N-diethyl-N-propyl-N-methyl ammonium bromide;
N,N,N-triethyl-N-2-bromoethyl ammonium bromide;

N,N-dimethyl-N-ethyl-N-isopropyl ammonium bromide;

N,N,N-triethyl-N-butyl ammonium bromide;

N,N-diethyl-N,N-dimethyl ammonium bromide;

N,N,N-triethyl-N-methyl ammonium bromide;

N,N-diethyl-N-methyl-N-chloromethyl ammonium bromide;

N-2-chloroethyl-N,N,N-trimethyl ammonium bromide; and mixtures thereof.

25. The battery as set forth in claim 20 further comprising means for storing additive-halogen complex produced during charging.

26. The battery as set forth in claim 20 wherein the electrodes are bipolar.

* * * * *

UNITED STATES PATENT AND TRADEMARK OFFICE
CERTIFICATE OF CORRECTION

PATENT NO. : 4,104,447
DATED : August 1, 1978
INVENTOR(S) : Fraser M. Walsh et al.

It is certified that error appears in the above-identified patent and that said Letters Patent are hereby corrected as shown below:

Column 2, line 67, change "any" to --many--

Column 4, line 51, change "=" to --+--

Signed and Sealed this

Second Day of January 1979

[SEAL]

Attest:

RUTH C. MASON
*Attesting Officer*

DONALD W. BANNER
*Commissioner of Patents and Trademarks*